G. S. KARCK AND S. H. VARNDELL.
COIN FREED DELIVERY APPARATUS.
APPLICATION FILED NOV. 22, 1919.

1,330,540.

Patented Feb. 10, 1920.
8 SHEETS—SHEET 8.

INVENTORS:
George S. Karch
Sydney H. Varndell
BY Wm Wallace White
ATTY.

UNITED STATES PATENT OFFICE.

GEORGE STIRLING KARCK AND SYDNEY HERBERT VARNDELL, OF LONDON, ENGLAND.

COIN-FREED DELIVERY APPARATUS.

1,330,540. Specification of Letters Patent. Patented Feb. 10, 1920.

Application filed November 22, 1919. Serial No. 339,971.

*To all whom it may concern:*

Be it known that we, GEORGE STIRLING KARCK, of 20 Fenchurch street, London, E. C., England, director, and SYDNEY HERBERT VARNDELL, of 50 Rutland Gardens, Harringay, London, N. 4, England, engineer, subjects of the King of Great Britain and Ireland, have invented certain new and useful Improvements in or Relating to Coin Freed Delivery Apparatus, of which the following is a specification.

This invention relates to coin freed delivery apparatus for delivering towels and other articles of the type in which shelves are disposed one above the other and adapted to be released one at a time commencing with the bottom shelf by the angular movement of a vertical member which is adapted to be operated by a coin freed mechanism. The object of this invention is to provide an improved apparatus of this type.

Apparatus made in accordance with this invention is characterized in that the releasing mechanism for each shelf forms a self contained unit, comprising a plate, a pivoted supporting lever on said plate, a spring pressed trip lever adapted to hold up one end of the supporting lever, an arm pivoted on said trip lever, a sliding striker mounted on said plate, means for putting said arm automatically in an operative position with respect to said striker one by one as the mechanism below is operated.

Referring to the drawings filed herewith:—

$a$ is a main frame, $b'$ $b^2$ $b^3$ are shelves pivotally mounted on bars $c'$ $c^2$ $c^3$. Below each shelf are supporting frames $d'$ $d^2$ $d^3$ pivotally mounted on the bars $c'$ $c^2$ $c^3$.

Figure 2:
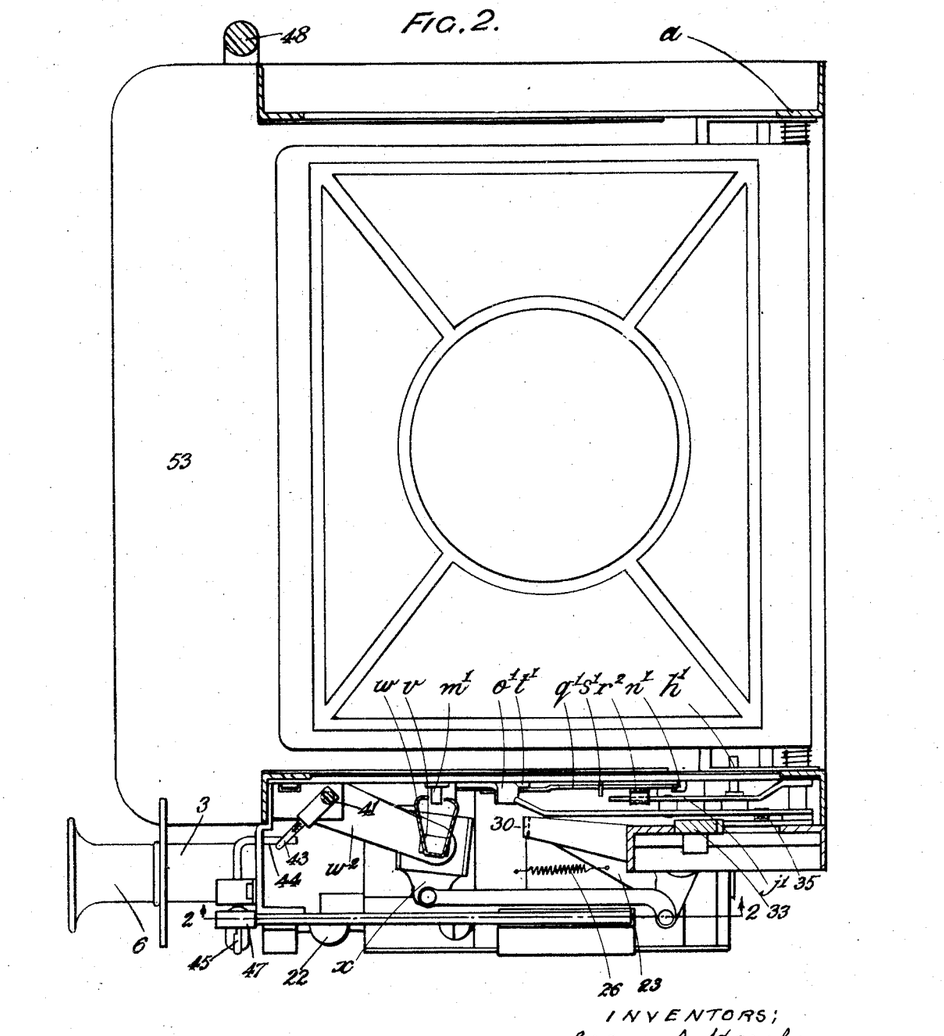
Fig. 2 is a sectional plan.
Figure 4:
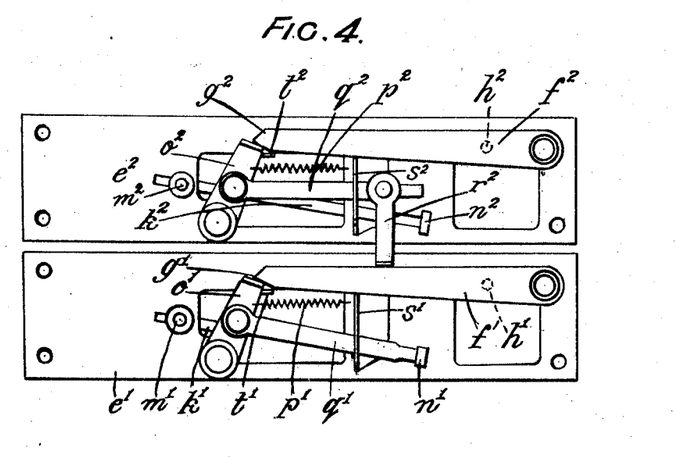
Fig. 4 is an elevation of two units of the shelf supporting and releasing mechanism, the lower mechanism being in an operative position, and the upper mechanism in an inoperative position.
Figure 5:
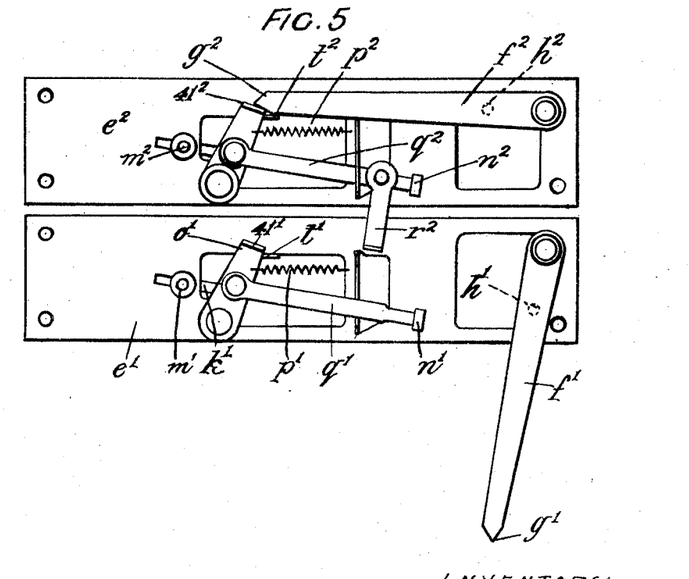
Fig. 5 is a similar view to Fig. 4 showing the lower mechanism after it has been released and the upper mechanism in an operative position.
Figures 6, 7:
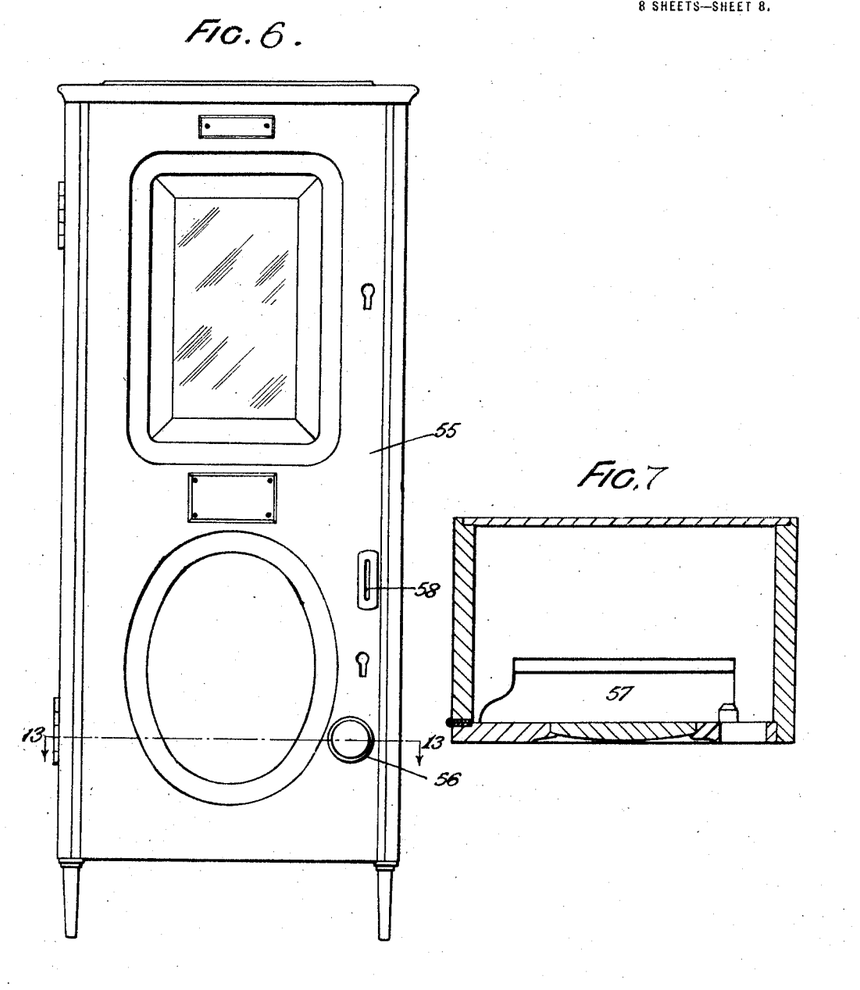
Fig. 6 is an elevation of the inclosing casing.
Fig. 7 is a horizontal section of the inclosing casing, on line 13—13 of Fig. 13.

Mounted on the main frame are a series of shelf releasing mechanisms, each forming a self contained unit comprising a plate $e'$ $e^2$ $e^3$. Describing the bottom one, on the plate $e'$ (see Fig. 4) is pivoted a supporting lever $f'$ provided with a pointed end $g'$ and a pin $h'$. The supporting lever $f'$ has a short inner member $j'$. (See Fig. 2). On the plate $e'$ is a sliding striker $k'$ provided with a stud $m'$ at one end and a foot $n'$ at the other end. On the plate $e'$ is a pivoted trip lever $o'$ held in its normal position by a spring $p'$. To the lever $o'$ is pivoted an arm $q'$ adapted when in its lowest position to engage the foot $n'$ of the striker $k'$. The arms $q^2$ $q^3$ but not the arm $q'$ are each provided with a supporting finger $r^2$ $r^3$ adapted to rest on the short members $j'$ $j^2$ on the levers $f'$ $f^2$. Lips on the levers $o'$ $o^2$ $o^3$ support the ends of the levers $f'$ $f^2$ $f^3$.

The arms $q'$ $q^2$ $q^3$ each pass through corresponding slots in flanges $s'$ $s^2$ $s^3$ in the plates $e'$ $e^2$ $e^3$, whereby the angular movement of each arm is limited, the lowest position insuring engagement with the feet $n'$ $n^2$ $n^3$. The plates $e'$ $e^2$ $e^3$ are also provided with lugs $t'$ $t^2$ $t^3$ which determine the normal positions of the levers $o'$ $o^2$ $o^3$.

On the main frame $a$ is mounted a vertical rocking spindle $v$ provided with a trough shaped bar $w$ (see Fig. 2) adapted to engage the studs $m'$ $m^2$ $m^3$ on the strikers $k'$ $k^2$ $k^3$. The spindle $v$ is provided with bearings $w'$ $w^2$ $w^3$ supported on the frame $a$. At the base of the spindle $v$ is a lever $x$ for connecting with operating mechanism. The trough shaped bar $w$ is held in its normal position by a spring $y$. (See Fig. 1ª.)

Figure 3:
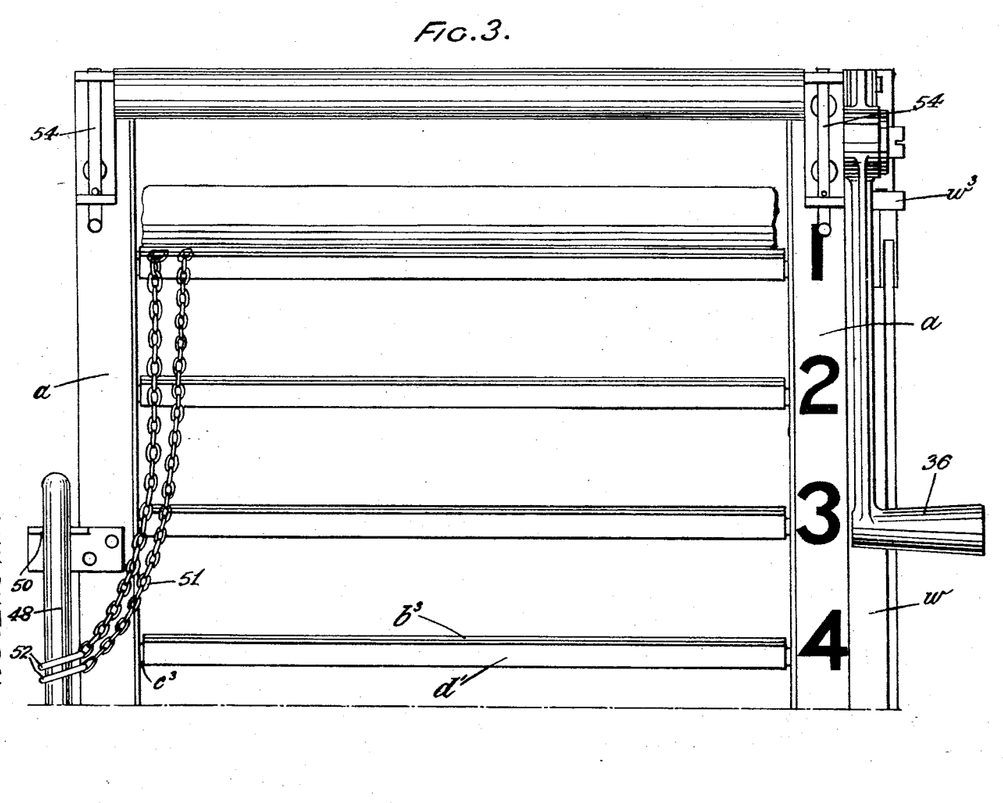
Figs. 3, 3ª and 3ᵇ together form a front elevation.
Figure 3A:
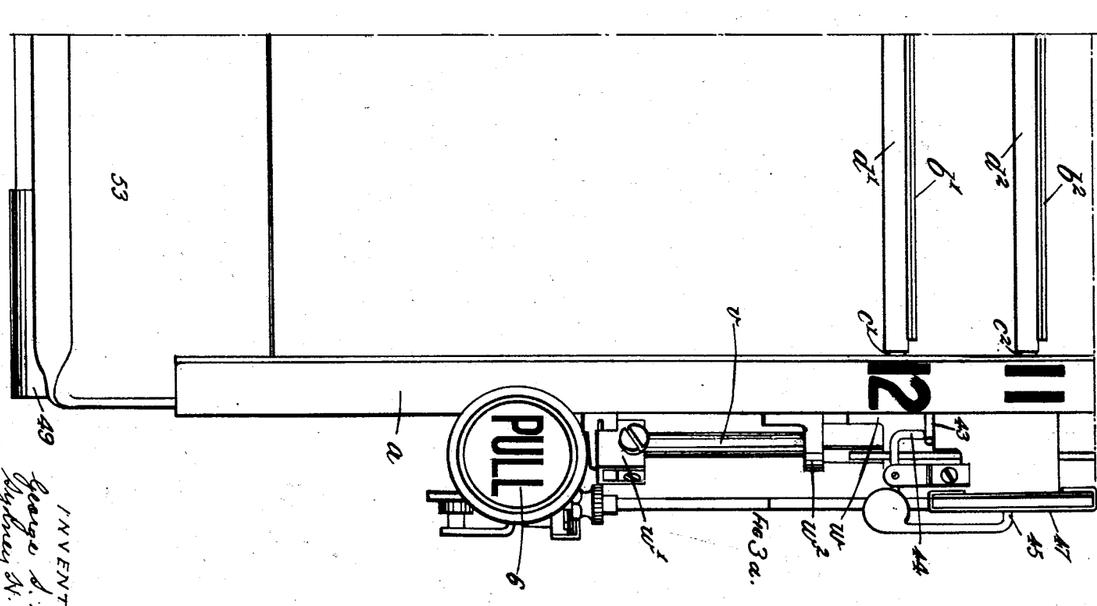
Figure 3B:
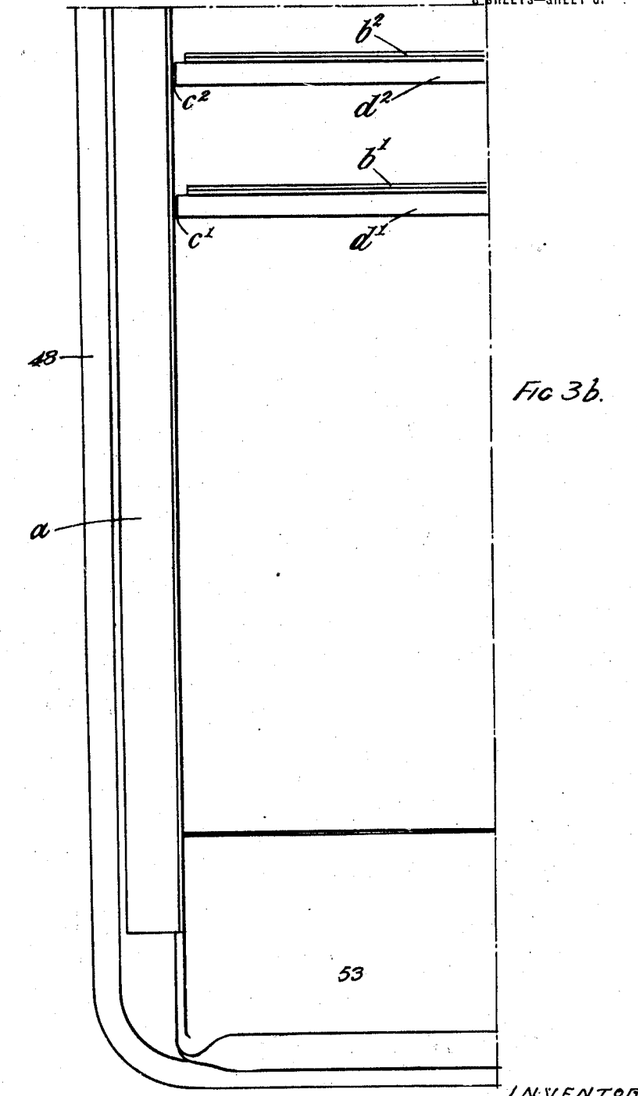

In use assuming all the shelves $b'$ $b^2$ $b^3$ to be in their raised position, the arm $q'$ is in engagement with the foot $n'$ of the striker $k'$ (Fig. 4), so that when the rocking spindle $v$ is operated the striker $k'$ pushes the arm $q'$ moving the lever $o'$ so that it no longer supports the arm $f'$ whereupon the lever $f'$ falls allowing the supporting frame $d'$ and shelf $b'$ (Figs. 3, 3ª and 3ᵇ) also to fall.

On the main frame $a$ of the machine is mounted a bracket 2 provided with bearings 3 and 4 adapted to support a rod 5 provided with a handle 6.

In use when the operating mechanism has been released by means of a coin, the action of drawing out the handle 6, moves the rocking spindle $v$ and operates all the strikers $k'\ k^2\ k^3$. The foot $n'$ of the striker $k'$ contacts with the arm $q'$ and the latter moves the trip lever $o'$. This releases the lowermost shelf, and permits the arm $q^2$ to fall into position for the next operation.

When the handle has been drawn out to the full extent the pawl 8 has passed over the teeth 7 of the rack on the rod 5 and the lip 30 of the bell crank lever 29 passes to the end of the flange 24 of the lever 23 and is pulled into its normal position by the spring $y$, operating through the rocking spindle $v$, lever $x$ and links 32.

On the operator releasing the handle 6, the rod 5 is retracted by the spring 20.

The mechanism for raising the shelves to their horizontal position comprises a rack 33 adapted to engage toothed segments $34'\ 34^2\ 34^3$ mounted on the supporting bars $c'\ c^2\ c^3$. The quadrants are provided with flanges 35 (see Fig. 2) adapted to engage the levers $f'\ f^2\ f^3$. The rack 33 is adapted to be raised by a handle 36 through a link 37 and lever 38 pivoted to the frame at 39, the end of the lever 38 being provided with a slot $39^a$ to engage a pin 40 on the rack 33. On lifting the handle 36 all the levers $f'\ f^2\ f^3$ are raised to engage the lips $41'\ 41^2$ of the lever $o'\ o^2\ o^3$ and are supported thereby, the corresponding supporting frames $d'\ d^2$ and $d^3$ and shelves $b'\ b^2$ and $b^3$ being raised and supported thereby.

Figure 1:
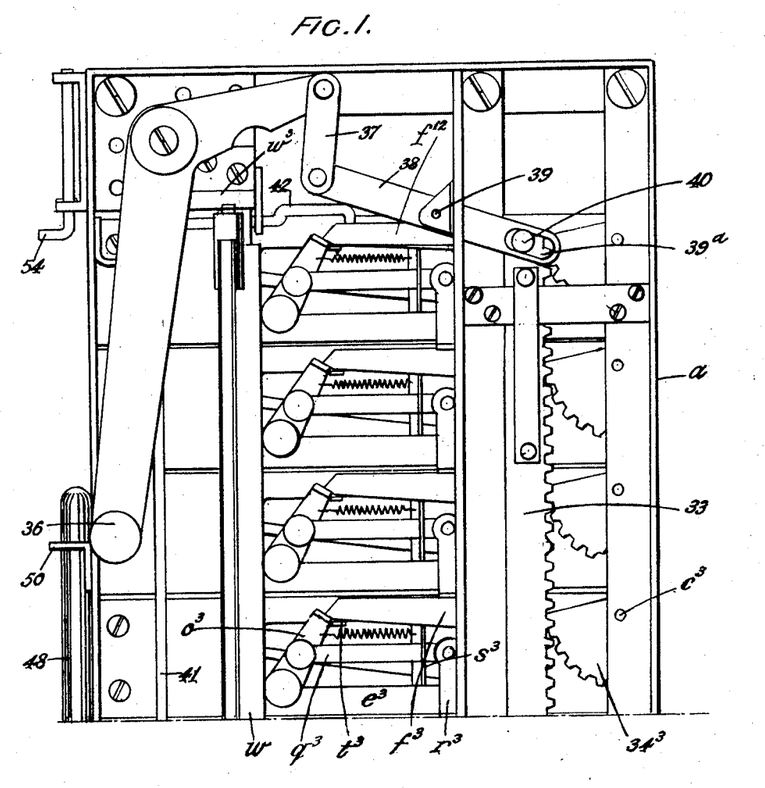
Figures 1 and 1ª together form a side elevation of a vending machine embodying this invention, and adapted for use in delivering towels.
Figure 1A:
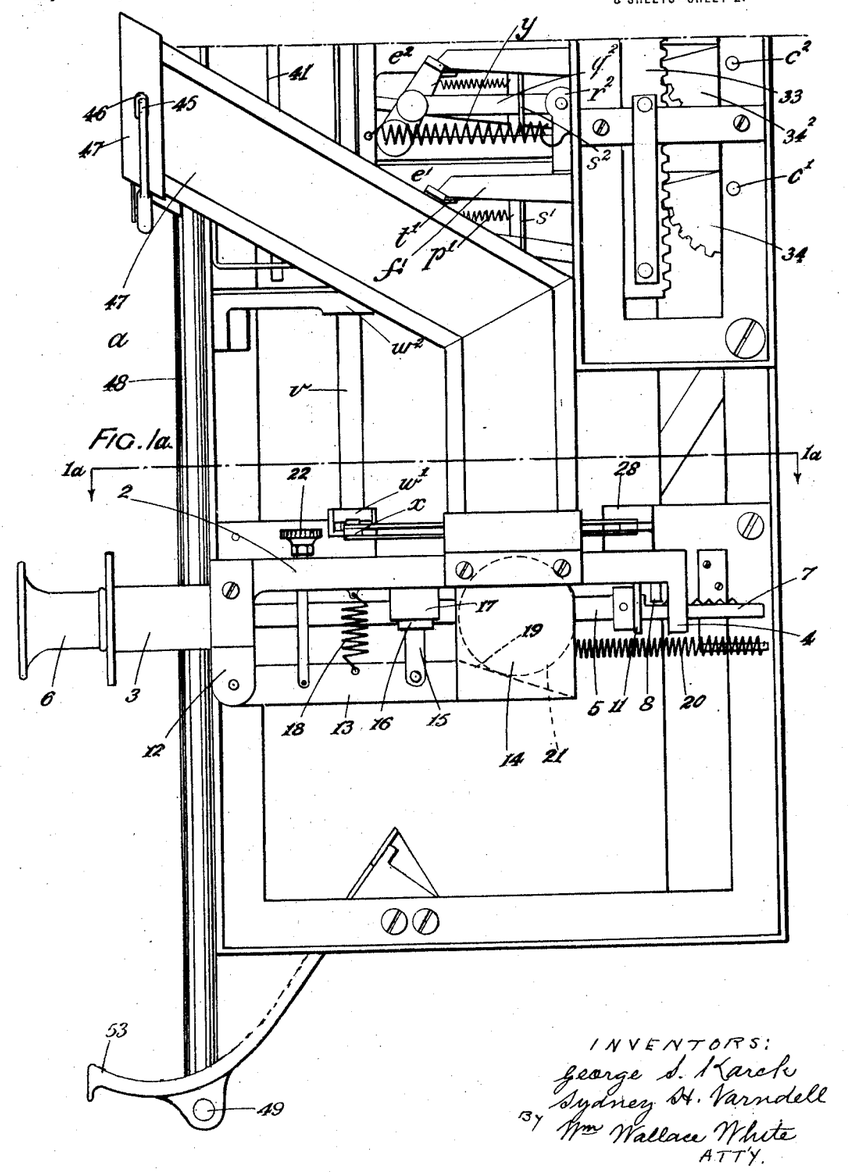

The mechanism for closing the coin chute when all the shelves have been released comprises a rod 41 supported on the main frame $a$ and provided with a bent end 42 which rests upon the top lever $f^{12}$ (see Fig. 1). On the lower end of the rod 41 is a tappet 43 which is adapted to strike a bent lever 44 pivoted to the frame $a$, so that when the lever $f^{12}$ falls the rod 41 falls, causing the tappet 43 to strike the lever 44 so that its end 45 enters a hole 46 (see Fig. $1^a$) in the chute 47 and prevents a coin being placed in the machine.

Means may be provided so that the towels can be delivered from the machine in a position ready for use but connected so that they cannot be readily removed by unauthorized persons, such a means comprises a bent rod 48 adapted to be placed on the frame of the machine but to lie within an inclosing casing. The lower end of the rod is held firmly in a socket 49 on the frame of the machine and the end is sprung into a clip 50 also on the frame $a$. Each towel is provided with eyelets through which a chain 51 provided with rings 52 is passed. The chain after being passed through the eyelet is placed on the rod 48 and the towels are placed on the shelves. The frame $a$ is provided with an inclined bottom 53 to allow the towels to slide out and with bolts 54 to secure the frame to the casing.

In use when the mechanism is operated a shelf falls and a towel falls down ready for use being supported by the chain. The outside casing 55 incloses the whole apparatus and is provided with a hole 56 to enable the handle to be reached by the operator and a slot 57 at the bottom to allow the towel to fall out and a slot 58 for the coin to enter the chute.

Although the machine has been more particularly described with reference to delivering towels it can be used for other purposes.

What we claim and desire to secure by Letters Patent is:—

1. Apparatus for delivering towels or other articles, comprising a frame, a coin freed mechanism on said frame, hinged shelves disposed one above the other on said frame, means for supporting said shelves, means for releasing said shelves one at a time commencing with the bottom shelf, the means for supporting and releasing each shelf comprising a plate, a pivoted supporting lever on said plate, a spring pressed trip lever adapted to hold up one end of the supporting lever, an arm pivoted on said trip lever, a sliding striker mounted on said plate, means for putting said arm automatically in an operative position with respect to said striker one by one as the mechanism below is operated in combination with a vertical rocking member always in engagement with said striker in each releasing mechanism, and means for rocking said vertical member.

2. Apparatus for delivering towels or other articles comprising a frame, a coin freed mechanism on said frame, hinged shelves disposed one above the other on said frame, means for supporting said shelves, means for releasing said shelves one at a time commencing with the bottom shelf, and means for simultaneously raising the shelves to their normal position.

3. Apparatus for delivering towels or other articles comprising a frame, a coin freed mechanism on said frame, hinged shelves disposed one above the other on said frame, means for supporting said shelves, means for releasing said shelves one at a time commencing with the bottom shelf, and means for raising the shelves to their normal position, said means for raising said shelves comprising a pivoted supporting frame below each shelf, a supporting lever pivoted on the main frame, one to each supporting frame, a pin on each supporting lever adapted to engage a supporting frame, a toothed segment pivoted to the main frame, one to each supporting frame, a flange on said toothed segments adapted to engage said supporting levers, a toothed rack on said main frame adapted to engage said toothed segments and means for operating said toothed rack so as to raise the supporting levers into an operative position.

4. Apparatus for delivering towels comprising a frame, a coin freed mechanism on said frame, hinged shelves disposed one above the other on said frame, means for supporting said shelves, means for releasing said shelves one at a time commencing with the bottom shelf, and means for simultaneously raising the shelves to their normal position, and means for detachably connecting the towels to the apparatus so that they can not be readily removed by an unauthorized person.

In testimony whereof we have signed our names to this specification.

GEORGE STIRLING KARCK.
SYDNEY HERBERT VARNDELL.